US012663046B2

(12) United States Patent
Dellon et al.

(10) Patent No.: US 12,663,046 B2
(45) Date of Patent: Jun. 23, 2026

(54) CLUTCH WITH RADIAL SPRING

(71) Applicant: Boston Dynamics, Inc., Waltham, MA (US)

(72) Inventors: Brian Todd Dellon, West Roxbury, MA (US); Adam Henry Borrell, Sudbury, MA (US); Christopher Robert LeBrun, Groton, MA (US)

(73) Assignee: Boston Dynamics, Inc., Waltham, MA (US)

( * ) Notice: Subject to any disclaimer, the term of this patent is extended or adjusted under 35 U.S.C. 154(b) by 463 days.

(21) Appl. No.: 17/692,768

(22) Filed: Mar. 11, 2022

(65) Prior Publication Data

US 2023/0287941 A1 Sep. 14, 2023

(51) Int. Cl.
| | |
|---|---|
| *F16D 7/02* | (2006.01) |
| *B25J 9/10* | (2006.01) |
| *F16H 49/00* | (2006.01) |

(52) U.S. Cl.
CPC ............ *F16D 7/025* (2013.01); *B25J 9/1025* (2013.01); *F16H 49/001* (2013.01); *F16H 2049/003* (2013.01); *Y10S 901/25* (2013.01); *Y10T 74/19614* (2015.01)

(58) Field of Classification Search
CPC ...... F16D 7/025; B25J 9/1025; F16H 49/001; F16H 2049/003; Y10S 901/25; Y10T 74/19614
USPC .................................. 74/405; 464/46; 901/25
See application file for complete search history.

(56) References Cited

U.S. PATENT DOCUMENTS

| | | | | |
|---|---|---|---|---|
| 2,569,593 | A | | 10/1951 | Whitney |
| 3,604,287 | A | * | 9/1971 | Humphreys ............ F16H 13/00 |
| | | | | 74/640 |
| 4,401,426 | A | | 8/1983 | Heidenreich |
| 4,645,472 | A | | 2/1987 | Heidenreich |
| 4,716,785 | A | * | 1/1988 | Godai .................. B25J 19/0058 |
| | | | | 901/25 |
| 4,738,583 | A | | 4/1988 | Macconochie |
| 4,973,215 | A | | 11/1990 | Karlen et al. |
| 5,155,423 | A | | 10/1992 | Karlen et al. |
| 5,355,063 | A | | 10/1994 | Boone |
| 9,387,588 | B1 | | 7/2016 | Blankespoor |
| 9,618,937 | B1 | | 4/2017 | Blankespoor |
| 9,789,920 | B2 | | 10/2017 | Hurst |

(Continued)

FOREIGN PATENT DOCUMENTS

| | | |
|---|---|---|
| GB | 1511609 | 5/1978 |
| WO | WO 2005085680 | 9/2005 |

(Continued)

OTHER PUBLICATIONS

International Search Report, International Application No. PCT/US2017/066206, May 30, 2018.

*Primary Examiner* — Greg Binda
(74) *Attorney, Agent, or Firm* — Knobbe Martens Olson & Bear LLP

(57) ABSTRACT

A clutch assembly includes a first member for mechanically coupling to an output shaft. A first material is frictionally coupled to a first side surface of the first member. A second material is frictionally coupled to a second side surface of the first member. A compliant member is configured to apply an axial force on at least one of the first material and the second material. A radial spring least partially surrounds an exterior surface of the first member.

15 Claims, 14 Drawing Sheets

(56)     References Cited

U.S. PATENT DOCUMENTS

| 9,827,678 | B1 | 11/2017 | Gilbertson |
| 9,862,263 | B2 | 1/2018 | Tesar |
| 10,125,854 | B2 | 11/2018 | Lingren et al. |
| 10,337,561 | B2 * | 7/2019 | Jackowski ............. B25J 9/1025 |
| 2005/0275367 | A1 | 12/2005 | Buehler |
| 2008/0245258 | A1 | 10/2008 | Herron et al. |
| 2011/0056321 | A1 | 3/2011 | Sim |
| 2013/0255426 | A1 | 10/2013 | Kassow et al. |
| 2014/0083245 | A1 | 3/2014 | Yeh |
| 2015/0051528 | A1 | 2/2015 | Gilbert et al. |
| 2015/0120044 | A1 | 4/2015 | Cory |
| 2015/0122559 | A1 | 5/2015 | Nagatsuka |
| 2018/0051789 | A1 | 2/2018 | Mendel |
| 2018/0215050 | A1 | 8/2018 | Kassow |
| 2018/0256989 | A1 | 9/2018 | Adekunle |
| 2020/0256399 | A1 | 8/2020 | Jackowski et al. |

FOREIGN PATENT DOCUMENTS

| WO | WO 2007082594 | 7/2007 |
| WO | WO 2013138913 | 9/2013 |
| WO | WO 20160160450 | 10/2016 |
| WO | WO 2016195748 | 12/2016 |
| WO | WO 2017186843 | 11/2017 |
| WO | WO 2017186844 | 11/2017 |

* cited by examiner

800

1000

┌─────────────────────────────────────────────────────────────────────┐
│ 1002 Supply rotational energy to a first member of a clutch assembly. │
└─────────────────────────────────────────────────────────────────────┘
                                  ↓
┌─────────────────────────────────────────────────────────────────────┐
│ 1004 Transfer a torque load from the first member of the clutch assembly to │
│ a torque transfer plate, wherein a radial spring surrounds the first member │
│ of the clutch assembly. │
└─────────────────────────────────────────────────────────────────────┘
                                  ↓
┌─────────────────────────────────────────────────────────────────────┐
│ 1006 When the torque load satisfies a torque limit defined at least in part │
│ by a compliant member of the clutch assembly, the first member slips │
│ relative to at least one material frictionally coupled to the first member of │
│ the clutch assembly. │
└─────────────────────────────────────────────────────────────────────┘

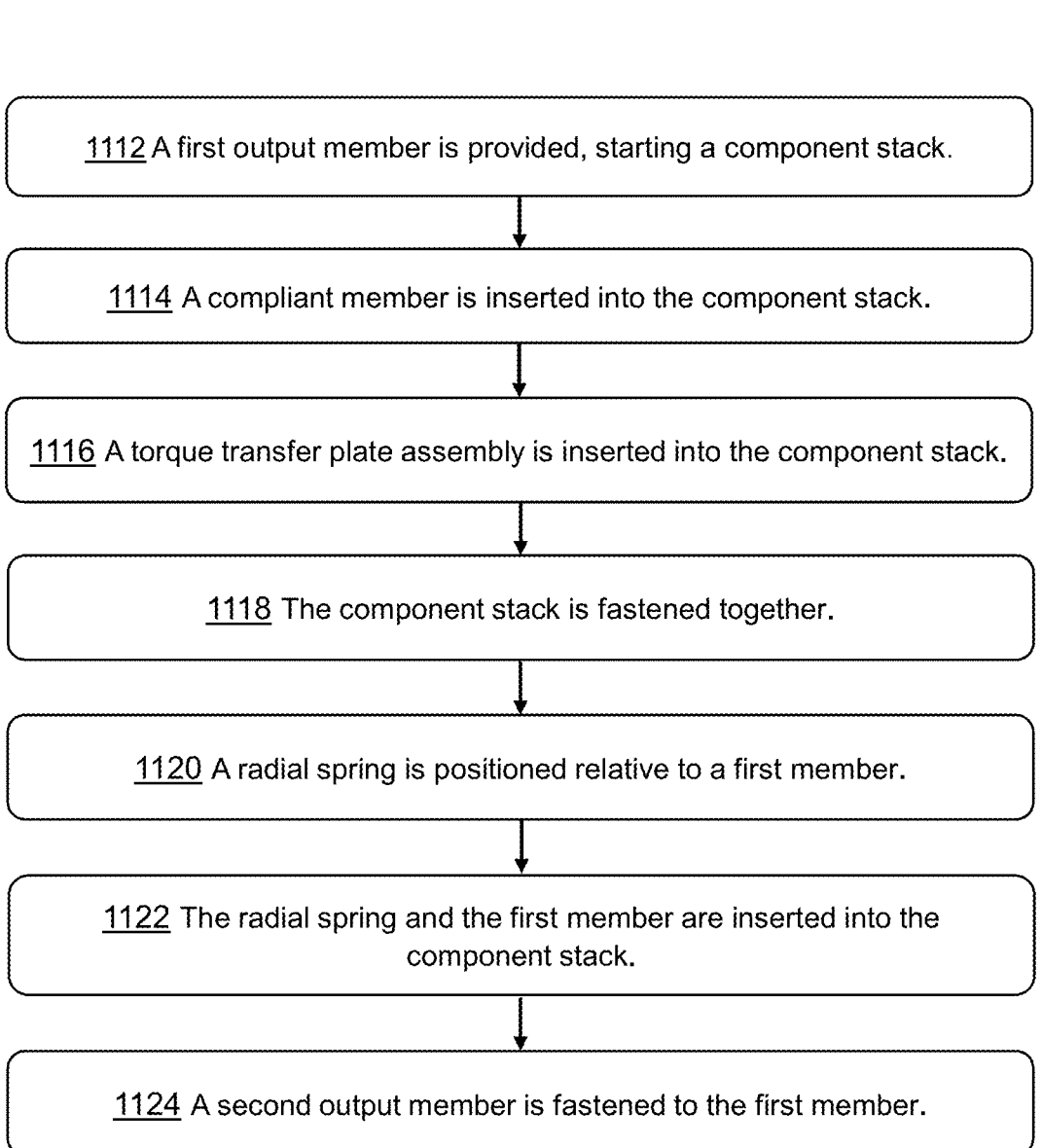

1112 A first output member is provided, starting a component stack.

1114 A compliant member is inserted into the component stack.

1116 A torque transfer plate assembly is inserted into the component stack.

1118 The component stack is fastened together.

1120 A radial spring is positioned relative to a first member.

1122 The radial spring and the first member are inserted into the component stack.

1124 A second output member is fastened to the first member.

FIG. 11

CLUTCH WITH RADIAL SPRING

TECHNICAL FIELD

This disclosure relates generally to systems, methods and apparatuses enabling mechanical overload protection and more specifically to clutches.

BACKGROUND

A clutch is a mechanical device that can engage and/or disengage power transmission (e.g., from an input shaft or "drive shaft" to an output shaft or "driven shaft"). Clutches are used in many applications today. Some exemplary applications include in motor vehicles (e.g., cars), power tools (e.g., drills), and a variety of other devices that move driven members (e.g., using actuators). In certain exemplary applications, robots can use clutches in connection with driven members (e.g., legs or manipulator arms) that utilize actuators for movement.

A robot is generally defined as a reprogrammable, multifunctional manipulator designed to move material, parts, tools, and/or specialized devices through variable programmed motions to perform tasks. Robots may be manipulators that are physically anchored (e.g., industrial robotic arms), mobile devices that move throughout an environment (e.g., using legs, wheels, or traction based mechanisms), or some combination of manipulator(s) and mobile device(s). Robots are utilized in a variety of industries including, for example, manufacturing, transportation, hazardous environments, exploration, and healthcare.

An example robot may have a set of members forming the robot's legs, arms, and/or manipulators. The motion of these members may be controlled by actuators. The design of these actuators can determine certain performance characteristics of the robot, e.g., how fast the robot can respond to commands and/or external disturbances. Design factors that may affect performance of the robot include rotary inertia of the actuators, a gear ratio of a transmission coupled thereto, and other factors.

SUMMARY

Conventional disc brake clutch packs typically align a driven member between friction pads using a series of kinematic constraints, e.g., one or more splines or other mechanical keying-based features. In one aspect of the present invention, the driven member can be constrained using a radial spring (e.g., a tolerance ring with a bushing lining). The radial spring can be tuned so that it contributes only a small amount of torque to the entire clutch set-point (e.g., less than 10%), but is still enough to enforce concentricity of the mated component (e.g., to enable self-centering). In addition, a wear characteristic between the radial spring and the mated component can be made highly durable. Furthermore, using a radial spring can allow a tolerance between the mating components to be expanded and/or loosened, lowering variability between similarly manufactured parts (e.g., due to imperfections of the manufacturing process). Integrating a radial spring into a clutch assembly in the novel ways described herein can be associated with significant unexpected benefits that are described in detail below.

To illustrate, consider one exemplary form of mechanical gear system called a harmonic drive (also commonly referred to as a strain wave gearing). A harmonic drive typically includes three primary components: (1) a wave generator; (2) a flex spline; and (3) a circular spline. In certain standard configurations, the wave generator is attached to an input shaft; the flex spline is attached to an output shaft; and the circular spline is fixed. However, in other configurations (e.g., in certain quadruped robots), the flex spline is fixed (e.g., to a torque cell, which directly measures the output torque of the actuator) and the circular spline is coupled to the output shaft. Such coupling can occur using a member (e.g., a friction plate clutch) that allows the circular spline to slip rather than transmit a torque too high for the gearset to handle. Exemplary details of such a system can be found in U.S. Pat. App. Pub. No. 2020/0256399, the content of which is hereby incorporated by reference in its entirety.

In a friction plate clutch, the circular spline can be pressed into a bushing, e.g., a custom machined Polyether Ether Ketone (PEEK) plastic bushing. The bushing can help keep the circular spline concentric with other drive elements and/or prevent it deforming (e.g., into an oval shape) under high loads. However, custom machined bushings can have multiple drawbacks. First, such bushings typically must be tightly toleranced, which can add cost in the form of an additional machining step during assembly. Second, if the bushing is initially manufactured for a tight fit, the bushing can add significant additional drag on the slipping circular spline. This drag can decrease over time as the bushing wears, making it difficult or impossible to design for a consistent slip torque. Third, if the bushing is initially manufactured for a looser fit, the bushing may not keep the circular spline concentric and circular, but may instead permit the circular spline to deform under high loads. When held by the friction plate clutch, this off-shaped spline can significantly decrease the efficiency of the drive.

To address at least some of these drawbacks, an aspect of the present invention uses a radial spring (e.g., a tolerance ring) in place of the bushing described in the above example. The radial spring can include a low-friction bushing lining, e.g., made of Polytetrafluoroethylene (PTFE). Using a radial spring in this application can help address one or more of the three above-noted drawbacks of the custom machined bushing it replaces. For example, the radial spring can replace a tight tolerance machining step with a simple installation (e.g., a press-fit) during assembly, reducing complexity and cost. Additionally, the radial spring can apply a low rotational drag on the circular spline that remains constant or substantially constant over the lifetime of the clutch, allowing for the design of a clutch with a consistent slip torque. Also, the radial spring can apply a constant or substantially constant radial force to the circular spline, holding it in its cylindrical shape, preventing it from deforming under high loads, and maintaining the high efficiency of the drive after clutch slip events.

The systems and methods disclosed herein can be used to protect gearboxes in a variety of devices. One skilled in the art will appreciate that the above-described example illustrates certain possible configurations, but other configurations are also possible. For example, in some embodiments, a planetary drive or a cycloidal drive can be used in place of a harmonic drive. One skilled in the art will also appreciate that the improved clutches disclosed herein may be applied in a variety of machines (e.g., in robots, automobiles, or any number of other devices) utilizing clutches.

In one aspect, the invention features a clutch assembly. The clutch assembly comprises a harmonic drive including a wave generator configured to mechanically couple to an input shaft, a flex spline, and a circular spline, wherein the flex spline is arranged to be rotationally fixed and the circular spline is arranged to rotate at a different speed than the wave generator when the wave generator rotates. The clutch assembly further comprises a first pad frictionally coupled to a distal side surface of the circular spline, a second pad frictionally coupled to a proximal side surface of the circular spline, a compliant member configured to apply an axial force on the first pad and the second pad; and a radial spring surrounding an exterior surface of the circular spline, the radial spring comprising a bushing lining.

In some embodiments, the axial force defines, at least in part, a torque limit, and when the torque limit is exceeded, the circular spline slips relative to at least one of the first pad or the second pad. In some embodiments, the radial spring defines, at least in part, the torque limit. In some embodiments, the radial spring contributes less than 10% to a magnitude of the torque limit.

In some embodiments, the radial spring comprises a tolerance ring. In some embodiments, the radial spring includes a set of features extending radially outward from an exterior surface of the radial spring. In some embodiments, the set of features includes at least one of protrusions, distensions, extensions, ridges, bulges, extrusions, or castellations. In some embodiments, the bushing lining comprises Polytetrafluoroethylene (PTFE).

In some embodiments, during operation, the bushing lining is configured to apply a substantially constant radial force to the circular spline. In some embodiments, the radial spring is configured to permit the circular spline to rotate freely during operation. In some embodiments, the assembly further comprises a constraint ring surrounding the radial spring, the constraint ring comprising an output assembly.

In some embodiments, the assembly further comprises a first output member surrounding the compliant member. In some embodiments, the assembly further comprises a second output member coupled to at least one of the first pad or the second pad.

In some embodiments, the assembly further comprises a motor disposed on a robot, the motor configured to drive movement a member of the robot. In some embodiments, the robot comprises a quadruped. In some embodiments, the robot comprises a biped. In some embodiments, the member of the robot comprises a manipulator arm. In some embodiments, the second pad is coupled to a second output member and the second output member is coupled to the member of the robot. In some embodiments, the compliant member comprises a Belleville spring. In some embodiments, the assembly further comprises a motor disposed on an automobile. In some embodiments, the assembly includes a robot comprising an assembly including some or all of the components above.

In one aspect, the invention features a clutch assembly. The clutch assembly includes a first member for mechanically coupling to an output shaft. The clutch assembly includes a first material frictionally coupled to a first side surface of the first member. The clutch assembly includes a second material frictionally coupled to a second side surface of the first member. The clutch assembly includes a compliant member configured to apply an axial force on at least one of the first material and/or the second material. The clutch assembly includes a radial spring at least partially surrounding an exterior surface of the first member.

In some embodiments, the first material comprises a first pad. In some embodiments, the second material comprises a second pad. In some embodiments, the first material and the second material have similar compositions and/or dimensions. In some embodiments, the axial force defines, at least in part, a torque limit. In some embodiments, when the torque limit is exceeded, the first member slips relative to at least one of the first material or the second material. In some embodiments, the radial spring defines, at least in part, the torque limit. In some embodiments, the radial spring contributes less than 10% to a magnitude of the torque limit.

In some embodiments, the radial spring comprises a tolerance ring. In some embodiments, the radial spring includes a set of features extending radially outward from an exterior surface of the radial spring. In some embodiments, the set of features includes at least one of protrusions, distensions, extensions, ridges, bulges, extrusions, or castellations. In some embodiments, the radial spring comprises a bushing lining. In some embodiments, the bushing lining comprises Polytetrafluoroethylene (PTFE) and/or another bushing material (e.g., PEEK and/or other plastics). In some embodiments, during operation the bushing lining is configured to apply a rotational drag on the first member, the rotational drag remaining substantially constant over a lifetime of the clutch. In some embodiments, such a configuration helps keep a consistent or substantially consistent slip torque over a useful life of the clutch.

In some embodiments, during operation the bushing lining is configured to apply a substantially constant radial force to the first member. In some embodiments, such a feature helps prevent it from deforming under high loads (e.g., for a circular spline, holding it in its cylindrical shape) and maintains high efficiency of the drive after clutch slip events. In some embodiments, the radial spring is configured to reduce radial deformation of a shape of the first member during operation. In some embodiments, the radial spring is configured to permit the first member to rotate freely during operation. In some embodiments, the first member is a circular spline. In some embodiments, the clutch assembly includes a constraint ring surrounding the radial spring, the constraint ring comprising an output assembly. In some embodiments, the constraint ring has a cup shape into which the circular spline, tolerance spring and/or radial spring are pressed.

In some embodiments, the clutch assembly includes a first output member surrounding the compliant member. In some embodiments, the first output member comprises at least one of an output plate or an output bushing assembly. In some embodiments, the clutch assembly includes a second output member coupled to at least one of the first material or the second material. In some embodiments, the second output member includes a secondary output assembly.

In some embodiments, the assembly includes a rigid member in mechanical communication with a surface including an inner diameter member of the compliant member (e.g., a first rigid member), the rigid member configured to compress the compliant member. In some embodiments, the rigid member comprises at least one of a bushing or a shim. In some embodiments, the clutch assembly includes a rigid member in mechanical communication with a surface including an outer diameter member of the compliant member (e.g., a second rigid member), the rigid member is configured to compress the compliant member. In some embodiments, the rigid member comprises at least one of a bushing or a shim. In some embodiments, the clutch assembly includes a torque transfer plate assembly disposed between the compliant member and the first member. In some embodiments, the radial spring at least partially surrounds an exterior surface of the first material and/or an exterior surface of the second material. In some embodiments, the exterior surfaces are annular.

In some embodiments, the assembly includes a second member mechanically coupled to the first member. In some embodiments, the assembly includes a third member mechanically coupled to the second member, the third member for mechanically coupling to an input shaft. In some embodiments, the first member, the second member, and/or the third member form a mechanical gear system. In some embodiments, the first member and the second member define a gear ratio of the mechanical gear system.

In some embodiments, the mechanical gear system is a harmonic drive. In some embodiments, the mechanical gear system is a cycloidal drive. In some embodiments, the cycloidal drive has no gears. In some embodiments, the cycloidal drive includes pre-loaded and/or rolling parts that transfer torque through friction. In some embodiments, the mechanical gear system is a planetary drive. In some embodiments, the planetary drive has a spur gear. In some embodiments, the planetary drive has low backlash and/or high reduction. In some embodiments, the first member is a circular spline. In some embodiments, the second member is a flex spline. In some embodiments, the second member is configured to transmit energy from the third member to the first member. In some embodiments, the third member is a wave generator. In some embodiments, when the third member rotates, the second member is rotationally fixed and the first member is permitted to rotate at a different speed than the third member.

In some embodiments, the assembly includes a motor disposed on a robot. In some embodiments, the motor is configured to drive movement a member of the robot. In some embodiments, the robot comprises a quadruped. In some embodiments, the robot comprises a biped. In some embodiments, the member of the robot comprises a leg. In some embodiments, the member of the robot comprises a manipulator (e.g., a manipulator arm). In some embodiments, the second material is coupled to the second output member. In some embodiments, the second output member is coupled to the member of the robot. In some embodiments, the compliant member comprises a Belleville spring. In some embodiments, the assembly includes a motor disposed on an automobile. In some embodiments, the assembly includes a robot comprising an assembly including some or all of the components above.

In another aspect, the invention features a method of operating a clutch assembly. The method includes supplying rotational energy to a first member of a clutch assembly. The method includes transferring a torque load from the first member of the clutch assembly to a torque transfer plate, wherein a radial spring surrounds the first member of the clutch assembly. When the torque load satisfies a torque limit defined at least in part by a compliant member of the clutch assembly, the first member slips relative to at least one material frictionally coupled to the first member.

In another aspect, the invention features a method of manufacturing a clutch assembly. The method includes providing a first output member, starting a component stack. The method includes inserting a compliant member into the component stack. The method includes inserting a torque transfer plate assembly into the component stack. The method includes fastening the component stack together. The method includes positioning a radial spring relative to a first member. The method includes inserting the radial spring and the first member into the component stack. The method includes fastening the second output member to the first member. In some embodiments, other elements are inserted into the component stack as well (the first rigid member and/or the second rigid member disclosed herein) and are included as part of the clutch assembly.

In another aspect, the invention features a clutch assembly including a harmonic drive. The harmonic drive includes a wave generator for mechanically coupling to an input shaft, a flex spline, and a circular spline. When the wave generator rotates, the flex spline is rotationally fixed and the circular spline is permitted to rotate at a different speed than the wave generator. The clutch assembly also includes a first pad frictionally coupled to a distal side surface of the circular spline. The clutch assembly also includes a second pad frictionally coupled to a proximal side surface of the circular spline. The clutch assembly also includes a compliant member configured to apply an axial preload on the first pad and the second pad, the axial preload defining, at least in part, a torque limit. The clutch assembly also includes a radial spring surrounding an exterior surface of the circular spline, the radial spring comprising a bushing lining.

BRIEF DESCRIPTION OF DRAWINGS

The advantages of the invention, together with further advantages, may be better understood by referring to the following description taken in conjunction with the accompanying drawings. The drawings are not necessarily to scale, and emphasis is instead generally placed upon illustrating the principles of the invention.

FIG. 10 is a flowchart showing an exemplary method of operating a clutch, according to an illustrative embodiment of the invention.

FIG. 11 is a flowchart showing an exemplary method of manufacturing a clutch, according to an illustrative embodiment of the invention.

Like reference symbols in the various drawings indicate like elements.

DETAILED DESCRIPTION

The following detailed description describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Example Robotic Systems

Figure 1:
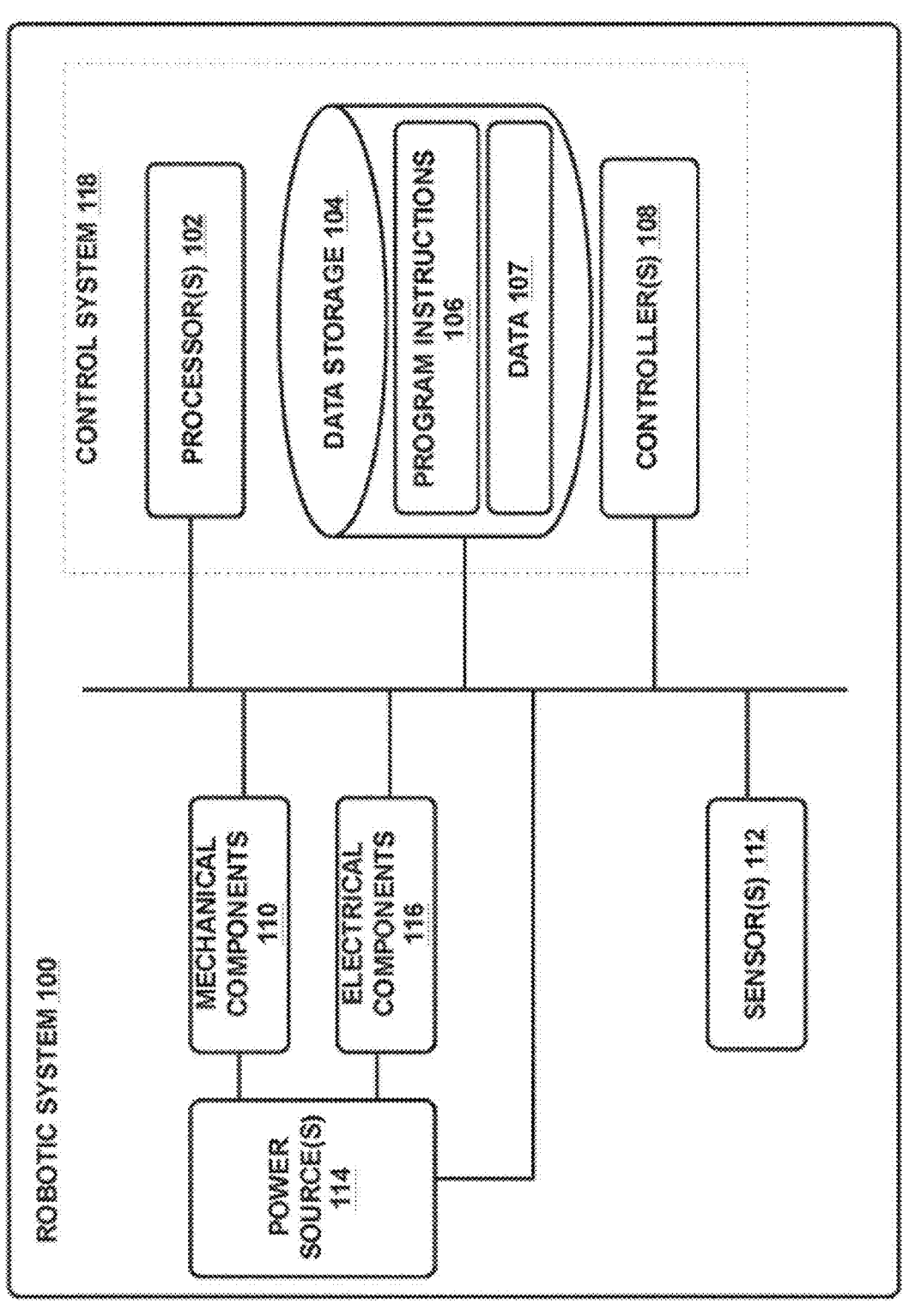
FIG. 1 illustrates a configuration of a robotic system, in accordance with an example implementation.

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement (e.g., a wheeled robot). Furthermore, the robotic system 100 may also be referred to as a robot, robotic device, or mobile robot, among other designations, and could be part of an exoskeleton or human assisting device.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic system 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device.

Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic system 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicitly discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic system 100, such as on the body and/or on one or more of the appendages, among other examples. On its body, the robotic system 100 may carry a load, such as a type of cargo that is to be transported. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
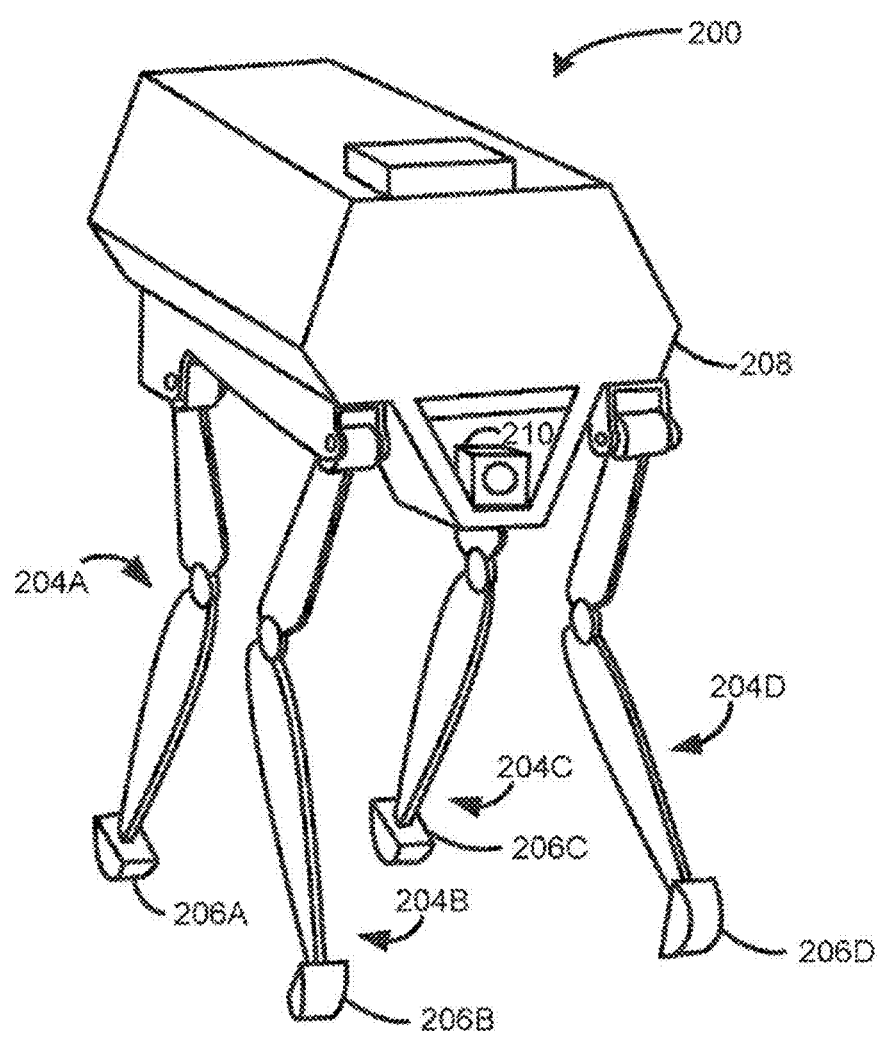
FIG. 2 illustrates a quadruped robot, in accordance with an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems. The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
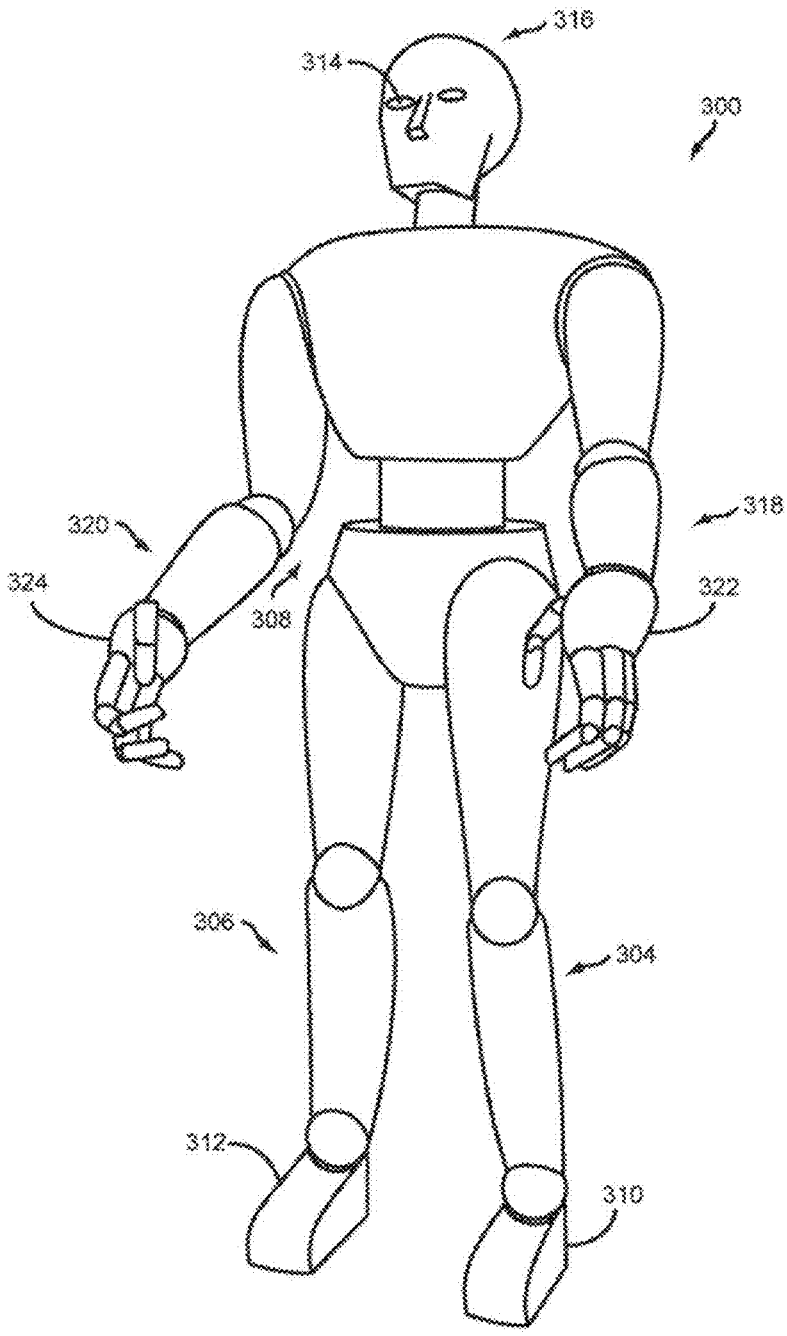
FIG. 3 illustrates a biped robot, in accordance with another example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 (or end-effectors) for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

Example Electromechanical Actuators for a Robot

In examples, hydraulic actuators could be used to actuate members of a robot. A hydraulic system may include a pump and accumulator at a central location on the robot and be configured to provide pressurized hydraulic fluid through pipes and/or hoses to hydraulic actuators coupled to the members of the robot. In this configuration, the actuation inertia of the pump and accumulator is decoupled from inertia provided to the ground surface as the robot moves. Due to the decoupling of inertias, hydraulic robotic systems are characterized by high bandwidth for position and force control responsiveness. However, hydraulic systems have disadvantages such as potential hydraulic fluid leaks, complexity of plumbing, and unsuitability of existing hydraulic power units to smaller robots.

Electromechanical actuators alleviate at least some disadvantages of hydraulic actuators because there are no leaks or complex plumbing involved with operating electromechanical actuators. Further, electromechanical systems may be more efficient than hydraulic systems. However, electromechanical actuators may have disadvantages compared to hydraulic systems. For instance, while the rotating inertia of a robot member driven by a hydraulic actuator might have a linear relationship with a diameter of the actuator for a given strength, the rotating inertia of a robot member driven by an electromechanical actuator may be proportional to the square of the diameter of the actuator's rotating assembly and is influenced by the gear ratio of the transmission for the given strength. Further, reflected inertia of a hydraulic actuator might be negligible compared to the inertia of a member (e.g., leg) of a robot, whereas reflected inertia of an electromechanical may depend on inertias of the motor and the transmission multiplied by the square of the gear ratio of the transmission. Thus, for large robots, electromechanical actuators may have a high inertia that limits responsiveness and performance characteristics of the robot.

For robots smaller in size, electromechanical actuators could be designed, as described in this disclosure, to achieve high performance characteristics compared to corresponding hydraulic actuators. Disclosed herein are systems, actuators, configurations, and apparatuses that reduce rotating inertia of robot members to allow for achieving high peak torques capable of providing sufficiently high accelerations suitable for high performance robots.

a. Example Screw Actuator for a Joint of a Robot

In examples, a knee joint of a robot may experience high accelerations that result, for example, from actuating the robot to move fast (e.g., run or jog). High accelerations could also result when the robot is subjected to a disturbance at its leg, and the robot responds with moving the leg, and particularly the knee joint, at a high acceleration to maintain balance. In some examples, an electric motor could be coupled to the knee joint of robot, such that rotational motion of the motor causes a lower leg member of the robot to rotate relative to an upper leg member that is coupled to the lower leg member at the knee joint. In this configuration, the rotational inertia of the motor may limit the responsiveness of the robot, and may thus reduce effectiveness of force control strategies of the lower leg member.

Further, if a transmission is coupled to the motor, and that transmission has a particular gear ratio that allows for speed reduction and torque amplification, the rotational inertia at the knee joint is proportional to the square of the gear ratio. So, a higher gear ratio that allows for higher torques may lead to a higher rotational inertia, thus reducing the responsiveness of the robot.

Reducing the rotational inertia at the knee joint may improve responsiveness of the robot. In an example, a screw actuator could be used to drive the knee joint of the robot, because screw actuators are light and slender and thus have low inertia compared to other actuator configurations. Further, using a screw actuator allows for a reduced distal mass at the knee, which may in turn allow for higher acceleration capabilities.

Figure 4:
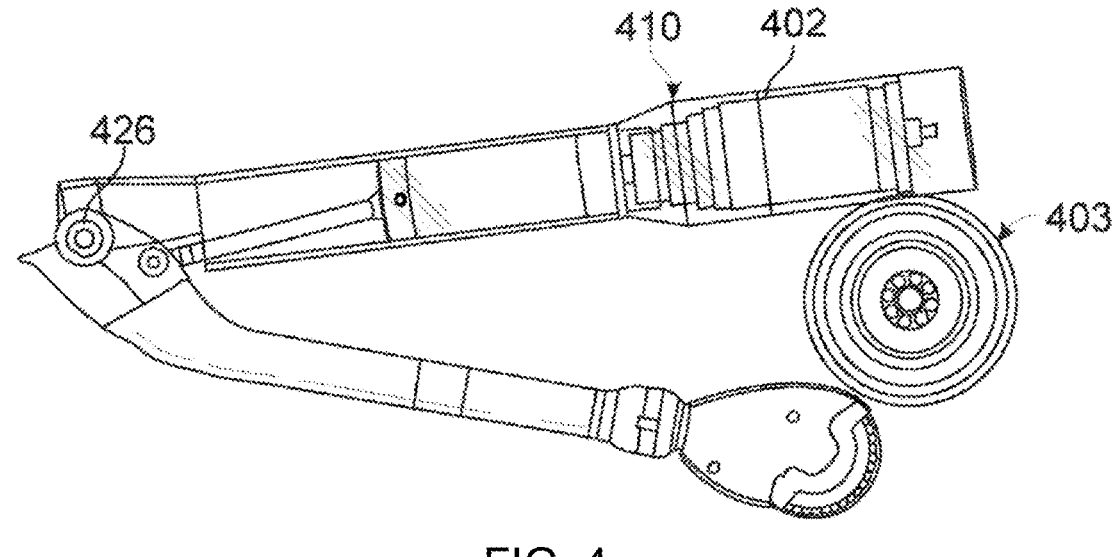
FIG. 4 illustrates an upper leg member offset relative to a hip joint, in accordance with an example implementation.

Other configurations for the robot leg could be implemented. FIG. 4 illustrates the upper leg member 410 offset relative to the hip joint 403, in accordance with an example implementation. As shown, the assembly including the upper leg member 410, and the components therein, is offset relative to the hip joint 403. This configuration may alleviate packaging constraints imposed by limiting a length of the upper leg member 410 based on the location of the hip joint 403. In other words, the length of the upper leg member 410 could be increased in the configuration of FIG. 4, for example. Alternatively, in other examples, offsetting the upper leg member 410 relative to the hip joint 403 may facilitate reducing an overall length from the knee pivot 426 to the hip joint 403.

Further, in the configurations discussed above, the motor 402 is disposed inline with the screw shaft 406. In some examples, these configurations could cause the upper leg member 410 to be relatively long. Other configurations could be used to shorten the upper leg member 410.

Figure 5:
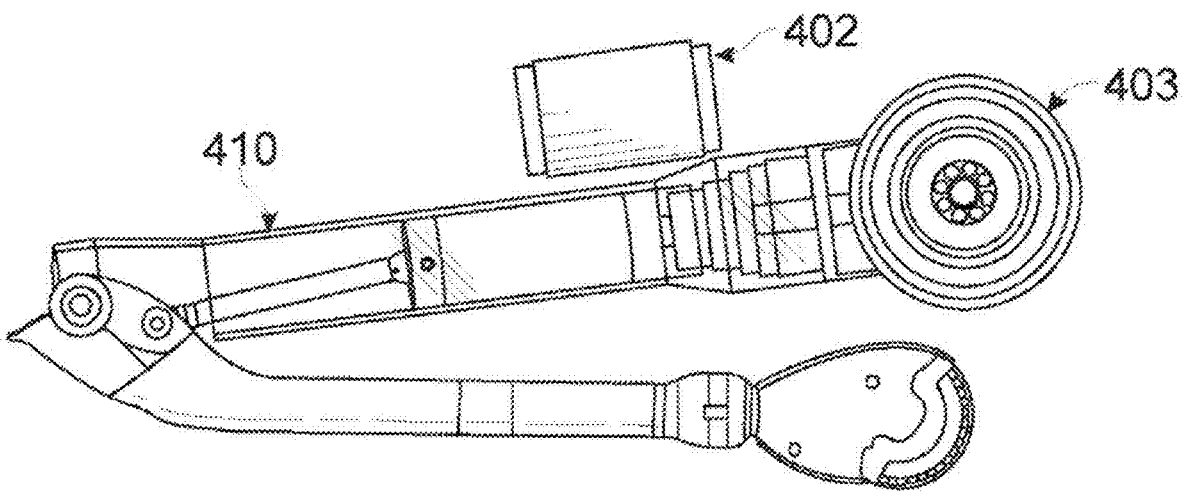
FIG. 5 illustrates a motor offset from an upper leg member, in accordance with an example implementation.

FIG. 5 illustrates the motor 402 offset from the upper leg member 410, in accordance with an example implementation. As shown, by removing the motor 402 from the upper leg member 410 and offsetting it relative to the upper leg member 410, the upper leg member 410 could be shortened. In this configuration a belt drive could be disposed as a speed reduction pre-stage between the motor 402 and the screw shaft 406. This speed reduction pre-stage could allow for reducing a speed reduction ratio of the screw actuator 400. Reducing the speed reduction ratio of the screw actuator 400 may reduce the rotational inertia, leading to higher performance characteristics as described below.

Generally, a roller screw may provide more bearing points or area than a ball screw within a given volume, and may thus lower contact stresses. Also, a roller screw can be more compact for a given load capacity while providing similar efficiency (e.g., 75%-90%) as ball screws at low to moderate speeds, and maintain relatively high efficiency at high speeds. A roller screw may further achieve better positioning accuracy, load rating, rigidity, speed, acceleration, and lifetime compared to a ball screw. However, a ball screw could be cheaper than a roller screw, and thus it may be desirable to use a ball screw for some applications.

b. Example Transmission with Integrated Clutch for Overload Protection

Rotational inertia affects the position and force control responsiveness of a robot. The effective rotational inertia at a joint of the robot may depend on the rotational inertia of the motor coupled to the joint and the rotational inertia of a transmission coupled to the motor. The transmission may have a particular gear ratio that allows for speed reduction and torque amplification, and the effective rotational inertia at the joint is proportional to the square of the gear ratio. So, a higher gear ratio that allows for higher torques may lead to a higher rotational inertia, thus reducing the responsiveness of the robot.

Typically, a large motor and low gear ratio may provide lower output inertia compared to a small motor and high gear ratio, but at the expense of greater mass. Thus, using a large motor to achieve higher torques and strengths may lead to a high rotational inertia, which reduces the responsiveness of the robot. Even if a small motor is used, a transmission with a high gear reduction ratio may also lead to a high effective rotational inertia.

In selecting a motor for a joint of a robot, one approach may entail determining a maximum torque that the joint is expected to be subjected to and selecting a motor that can achieve that maximum torque. However, this approach may lead to high effective rotational inertias. For example, in impact situations, such as when a leg of a robot hits a ground surface unexpectedly or the leg is subjected to a sudden impact by an object, the impact may cause the motor to spin at high speeds to respond to the impact and maintain the robot's balance. Particularly, the impact causes the motor and input side of the transmission to accelerate rapidly. The resulting inertial torque gets amplified by the gear ratio causing high torque at the joint, which may damage the transmission and/or the leg structure. The reflected inertia in this situation may be determined based on the sum of the rotational inertia of the motor and the transmission multiplied by the square of the reduction ratio of the transmission. Selecting a motor that can achieve a maximum torque that occurs in such impact situations may lead to a large motor with a corresponding large rotational inertia.

Another approach may entail impedance matching. Specifically, the motor and the transmission at a joint are selected to have a reflected or output inertia that is equal to the inertia of the robot member that is controlled by the joint. This approach may increase the acceleration capability of the joint.

In another example, the motor may be used to directly drive the member without a transmission coupled thereto. This way, the reflected inertia may be reduced. However, without a transmission, there is no torque amplification and the maximum torque is limited by the torque that the motor could achieve. Even if a transmission with a reduced gear ratio is used, the motor may then have a larger size to compensate for the reduced torque amplification at the transmission, thus leading to excessive weight and size.

An improved approach presented herein may entail integrating an overload protection system within the motor or the transmission. The overload protection system may isolate the transmission from high torques encountered in impact situations. This way, a reduced size transmission that can achieve appropriate torques and accelerations may be selected. A smaller transmission may have lower inertia, thus allowing for a smaller motor to achieve desired acceleration, because the overall inertia is reduced.

In some embodiments, systems and apparatuses include integrating a clutch to a harmonic drive transmission to allow for reducing a size of the motor and transmission, thus reducing mass and inertia to improve responsiveness of the robot. Such systems may, for example, be used at a hip joint of the robot or other joints.

Figure 6:
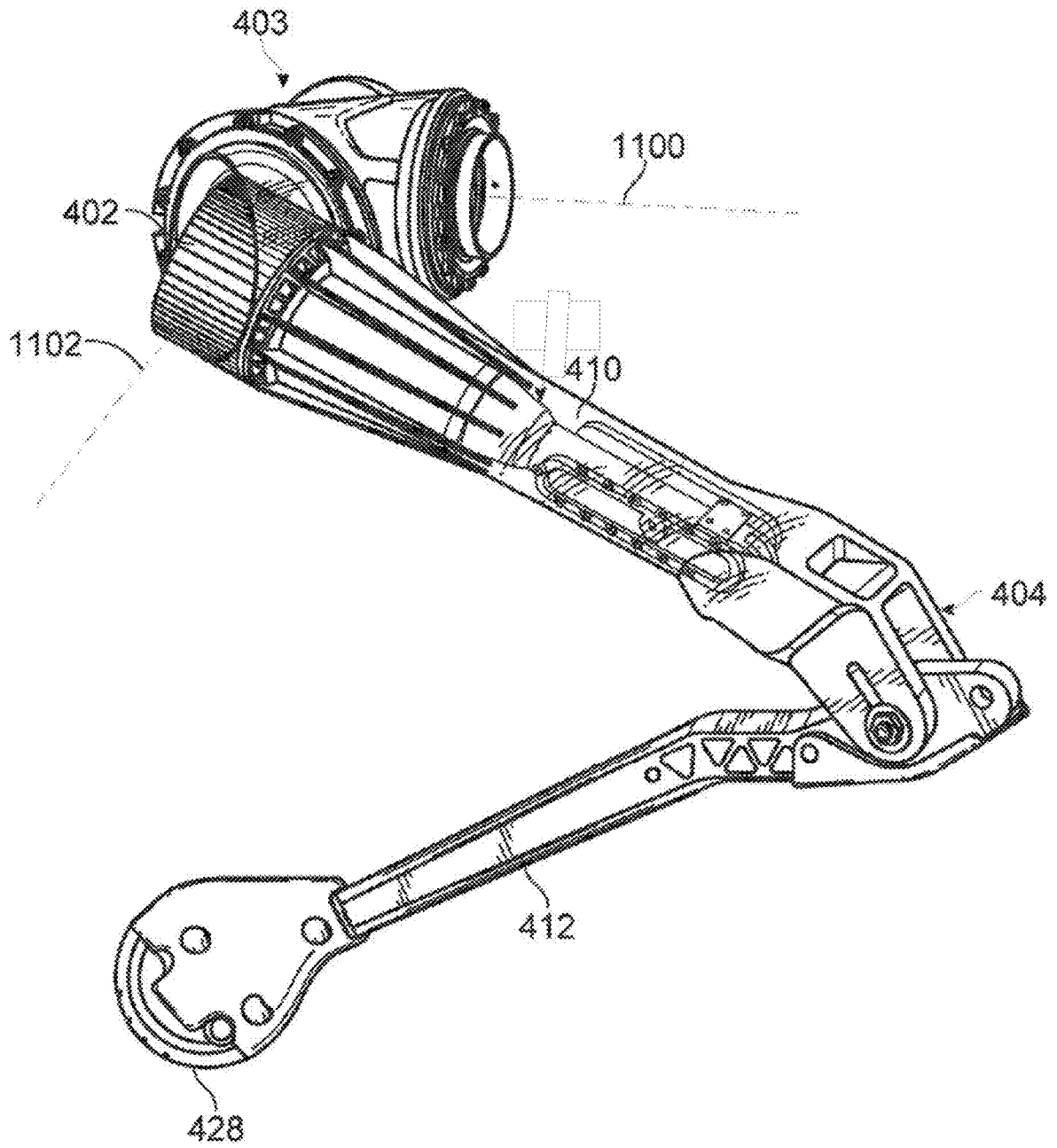
FIG. 6 illustrates a robot leg, in accordance with an example implementation.

FIG. 6 illustrates a robot leg, in accordance with an example implementation. As mentioned above, a screw actuator such as the screw actuator 400 may be used instead of a rotary gearbox to drive the knee joint 404. The screw actuator 400 may allow for reducing the distal mass at the knee joint 404. The distal mass affects the inertia of the leg, and placing mass closer to the hip reduces the inertial torque required at the hip joints. The screw actuator 400 may also reduce the effective rotational inertia because the screw actuator 400 has a reduced rotational inertia compared to a rotary gearbox.

Additionally, a motor and transmission with an overload protection system described herein may be coupled to the hip joint 403 to reduce the rotational inertia thereat. For instance, the motor and transmission may be installed along one or both of an x-axis 1100 and y-axis 1102 at the hip joint 403.

Figure 7A:
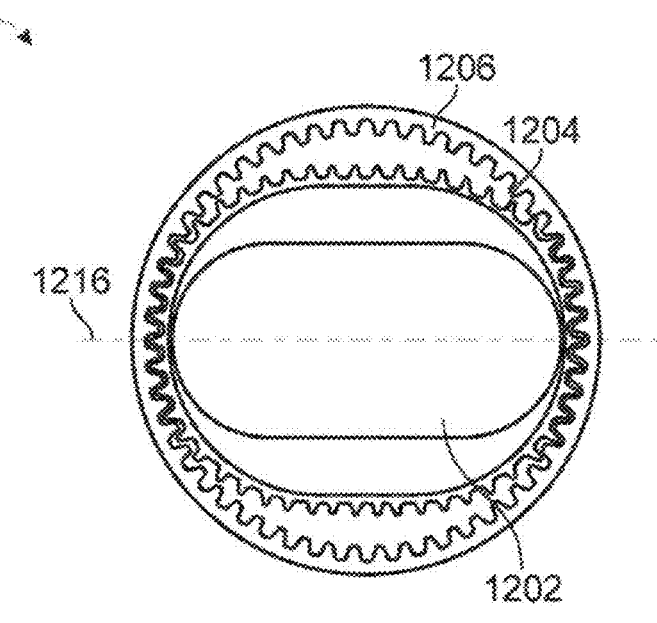
FIG. 7A illustrates a diagram showing operation of a harmonic drive, in accordance with an example implementation.
Figure 7B:
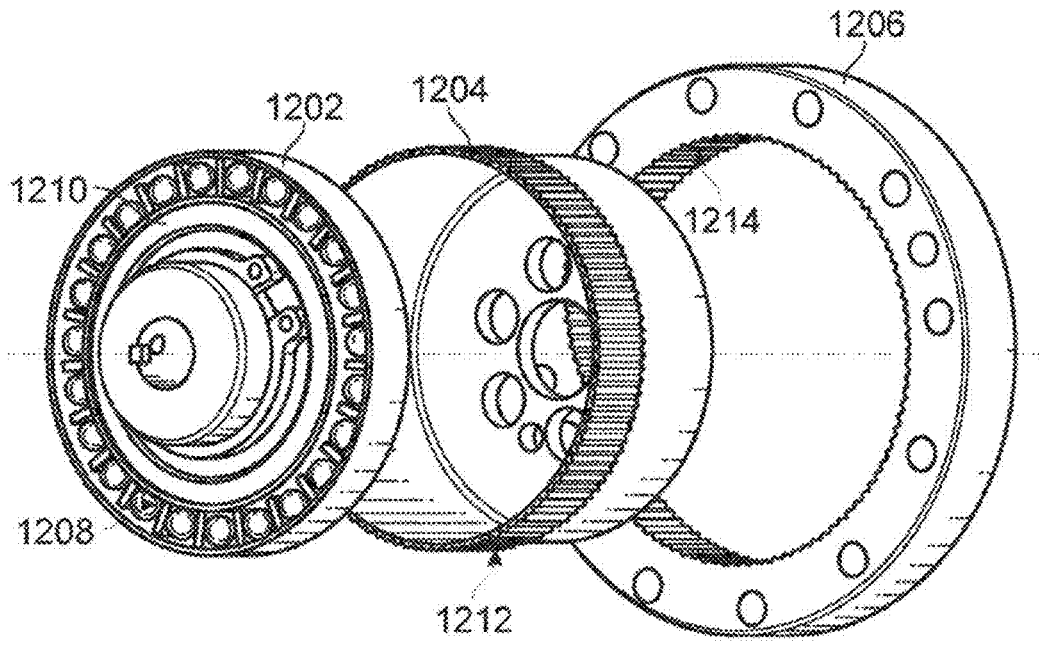
FIG. 7B illustrates an exploded view of the harmonic drive in FIG. 7A, in accordance with an example implementation.

FIG. 7A illustrates a diagram showing operation of a harmonic drive 1200, and FIG. 7B illustrates an exploded view of the harmonic drive 1200, in accordance with an example implementation. The harmonic drive 1200 is used herein as an example transmission system to operate as a speed reducer and torque amplifier. Harmonic drives are characterized by zero-backlash characteristics, a wide range of reduction ratios, weight and space savings compared to other transmission systems, high positional accuracy, and repeatability. However, other transmission systems, such as a cycloidal transmission or a planetary transmission, could be used.

As shown in FIG. 7A, the harmonic drive 1200 includes three main components: an input member that may be referred to as a wave generator 1202; an intermediate member that may be referred to as a flex spline 1204; and an outer member that may be referred to as a circular spline 1206. As illustrated in FIG. 7B, the wave generator 1202 may include a thin raced ball bearing 1208 that is fitted onto an elliptical hub 1210. The elliptical hub 1210 might not appear elliptical in FIG. 7B because the dimensional difference between the major and minor axes thereof is small. The wave generator 1202 operates as a torque converter and is connected to an input shaft from a motor, and thus operates as the input to the harmonic drive 1200.

The flex spline 1204 is a thin cylindrical cup made, for example, from alloy steel with external teeth 1212 on an exterior peripheral surface of an open end of the cup. The flex spline 1204 is radially compliant or flexible, but is torsionally stiff. When the wave generator 1202 is inserted into the flex spline 1204, the wave generator 1202 interfaces with the external teeth 1212 of the flex spline 1204 at the open end thereof. Thus, the open end of the flex spline 1204 takes on the elliptical shape of the wave generator 1202.

The circular spline 1206 is a rigid ring with internal teeth 1214. When the harmonic drive 1200 is assembled, the internal teeth 1214 of the circular spline 1206 engage with the external teeth 1212 of the flex spline 1204 across a major axis 1216 of the elliptically shaped wave generator 1202. The circular spline 1206 may have more teeth than the flex spline 1204. For instance, the circular spline 1206 may have two more teeth than the flex spline 1204.

In examples, the flex spline 1204 is used as the output and may thus be connected to an output flange, whereas the circular spline 1206 is fixedly mounted. In other examples, the circular spline 1206 is used as the output and may thus be connected to an output flange, whereas the flex spline 1204 is fixedly mounted. In the example description provided below, the circular spline 1206 is allowed to rotate and may be connected to an output, whereas the flex spline 1204 is fixedly mounted. However, other configurations could be used.

When the elliptical hub 1210 of the wave generator 1202 is rotated, the flex spline 1204 deforms to the shape of elliptical hub 1210 and does not slip over the outer peripheral surface of the ball bearing 1208. As a result, the external teeth 1212 of the flex spline 1202 engage the internal teeth 1214 of the circular spline 1206 at two opposite regions across the major axis 1216 of the wave generator 1202. For every 180 degree rotation of the wave generator 1202, the internal teeth 1214 of the circular spline 1206 are advanced by one tooth in relation to the external teeth 1212 of the flex spline 1204. Thus, each complete rotation of the wave generator 1202 may result in the circular spline 1206 moving by two teeth from its original position relative to the flex spline 1204.

With a harmonic drive such as the harmonic drive 1200, a wide range of gear reduction ratios are possible in a small volume (e.g., a ratio from 30:1 up to 320:1). As mentioned above, having a low ratio may reduce reflected or output inertia of the transmission, i.e., the harmonic drive 1200, to facilitate high performance capabilities of the robot. To protect the harmonic drive 1200 in high impact situations, systems and methods providing or helping to enable overload protection are described below.

Figure 8A:
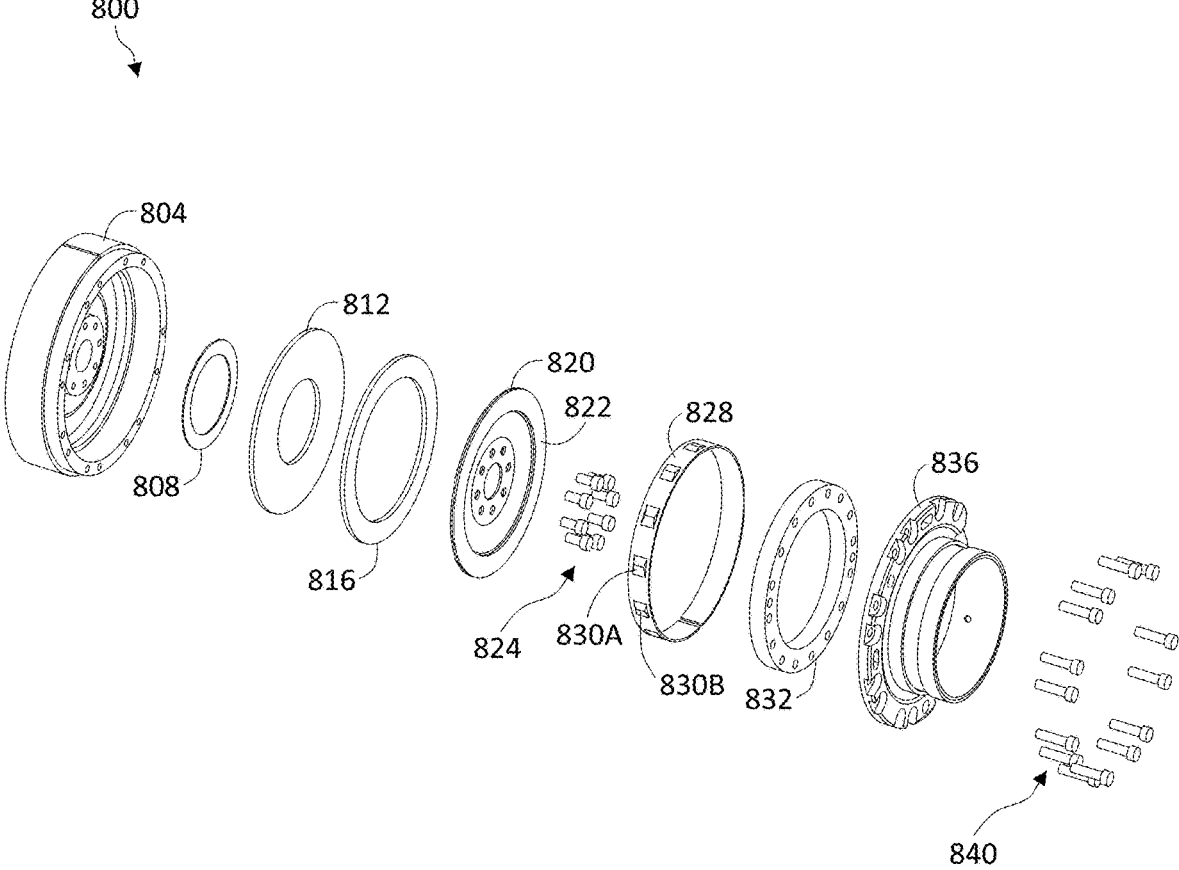
FIG. 8A is an exploded view of an exemplary clutch assembly, according to an illustrative embodiment of the invention.
Figure 8B:
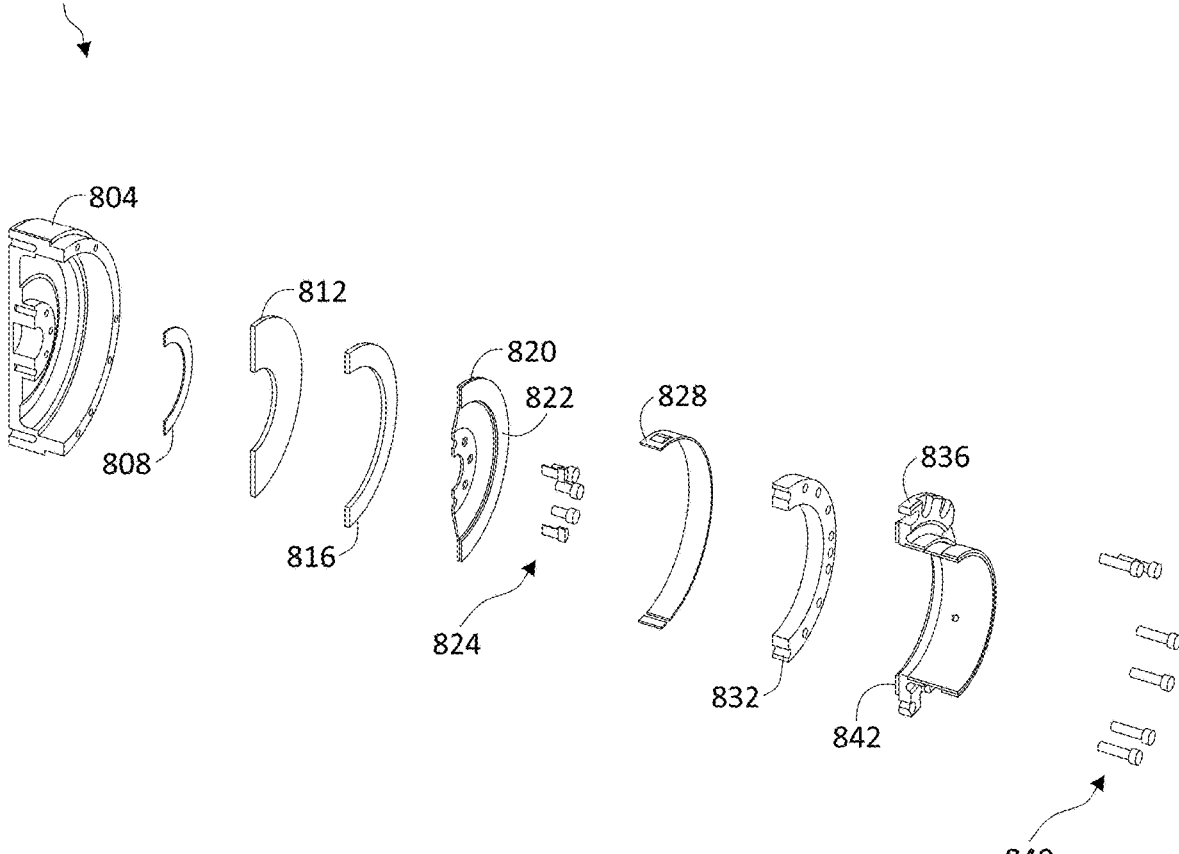
FIG. 8B is an exploded half-sectional view of an exemplary clutch assembly, according to an illustrative embodiment of the invention.
Figure 8C:
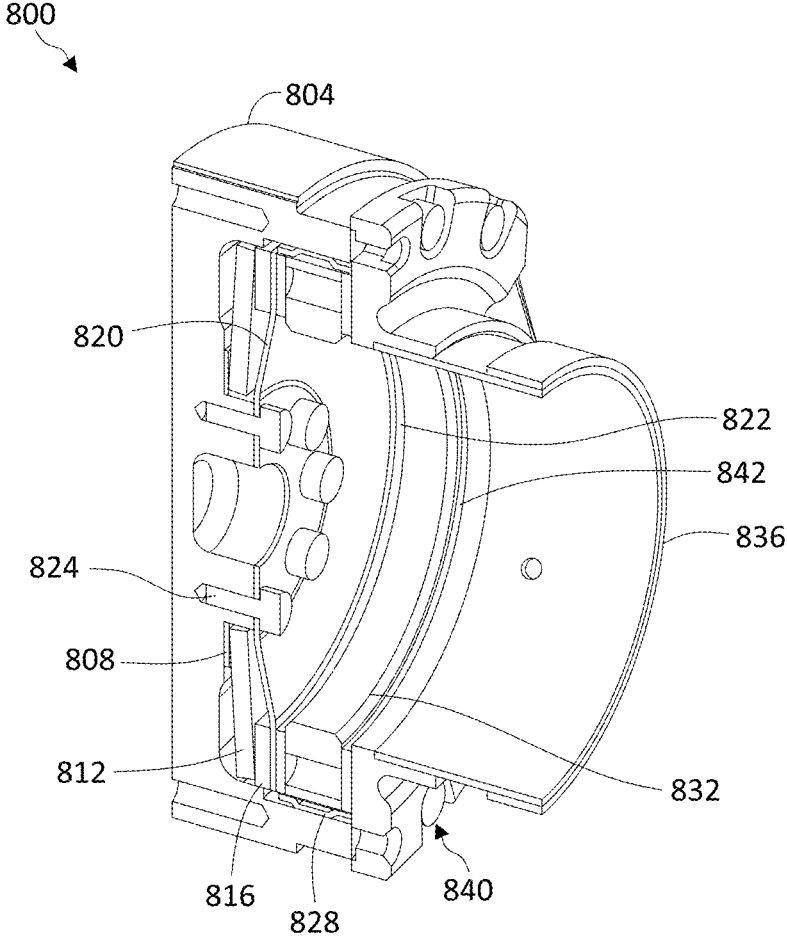
FIG. 8C is a perspective half-sectional view of an exemplary clutch assembly, according to an illustrative embodiment of the invention.
Figure 8D:
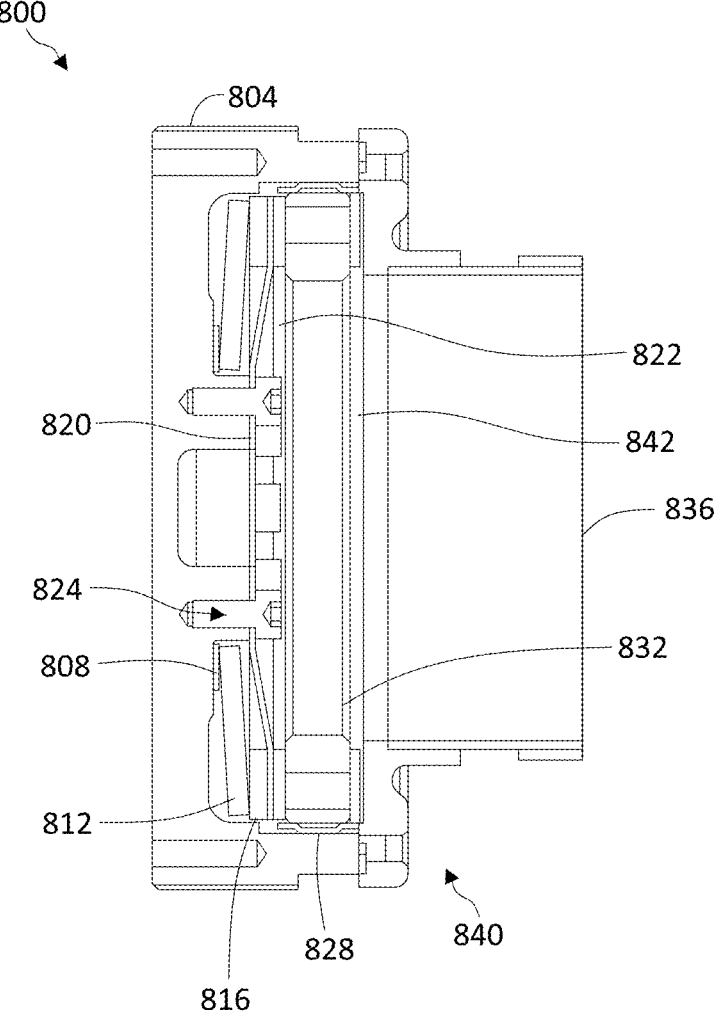
FIG. 8D is a cross-sectional view of an exemplary clutch assembly, according to an illustrative embodiment of the invention.
Figure 8E:
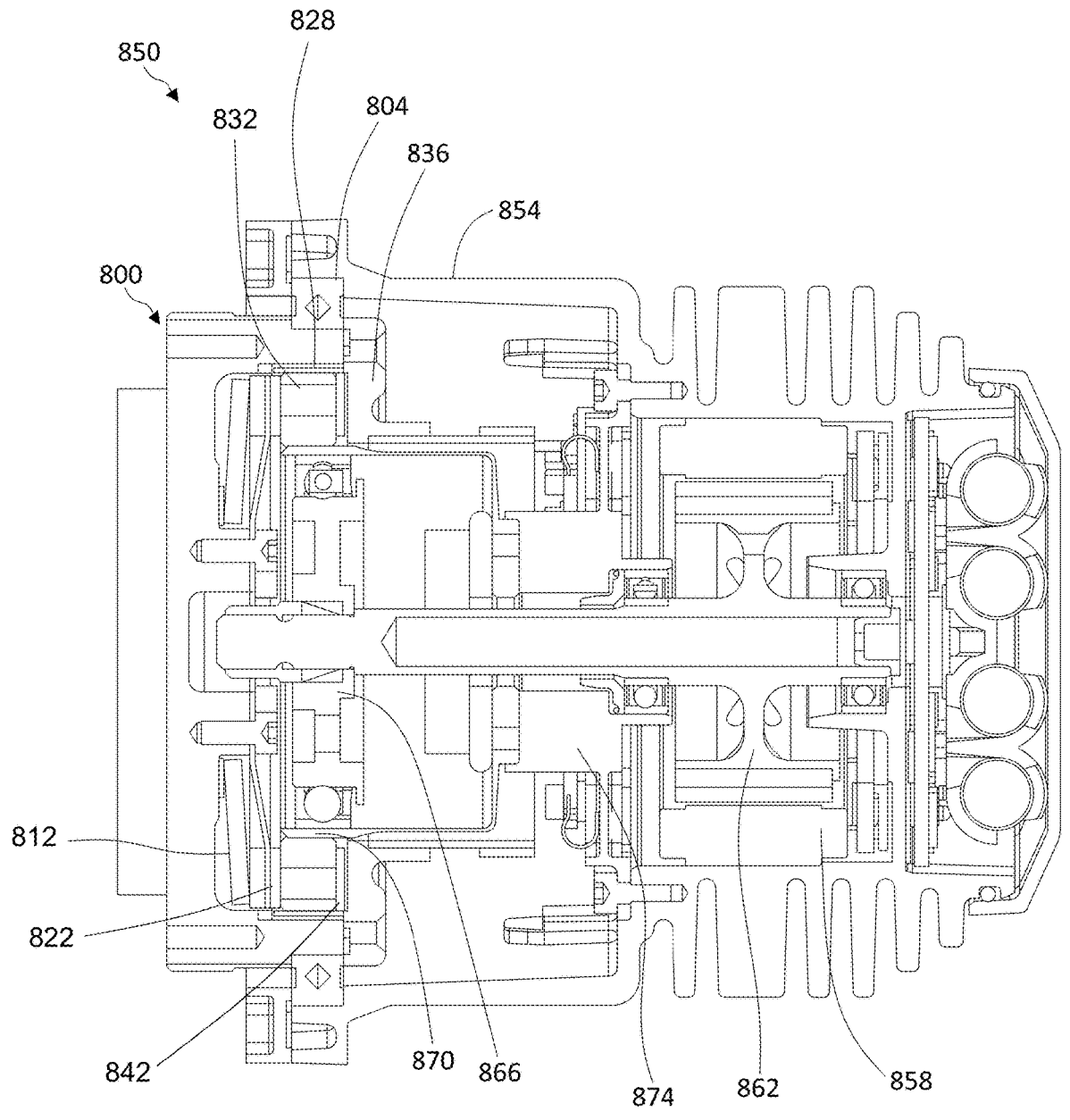
FIG. 8E is a cross-sectional view of an exemplary drive system including the clutch assembly of FIGS. 8A-8D, according to an illustrative embodiment of the invention.

FIGS. 8A-8D show different views of an exemplary clutch assembly 800, according to illustrative embodiments of the invention. FIG. 8E shows a cross-sectional view of an exemplary drive system 850 including the clutch assembly 800 of FIGS. 8A-8D. More specifically, FIG. 8A is an exploded view of the clutch assembly 800; FIG. 8B is an exploded half-sectional view of the clutch assembly 800; FIG. 8C is a perspective half-sectional view of the clutch assembly 800; FIG. 8D is a cross-sectional view of the clutch assembly 800; and FIG. 8E shows one exemplary drive system that incorporates the clutch assembly 800. FIGS. 8A-8E are described together below, with like numerals referring to like elements. The clutch assembly 800 (also referred to as a "clutch pack") includes an assembly of parts that forms a clutch (e.g., alone or in combination with other parts).

The clutch assembly 800 includes a first output member 804, which may include an output plate and/or an output bushing assembly. When assembled in the drive system 850 (e.g., as shown in FIG. 8E), the first output member 804 can mechanically couple to (e.g., be attached and/or bonded directly to) a housing 854 of the drive system 850, which can be coupled to a robot (e.g., a robot as shown and described in the figures above, such as a biped or a quadruped). The housing 854 can couple to the robot at any suitable location, e.g., at or near a joint, such as a hip joint or a manipulator arm joint. The housing 854 can include a motor 858, which can be mechanically mounted within the housing 854. A rotor of the motor 858 can be coupled to a shaft 862, and the rotor may be configured to rotate with the shaft 862, ultimately providing power to the gearset and/or clutch assembly 800 during operation. As used herein, a "proximal" side may refer to a side closer to the motor 858, whereas a "distal" side may refer to a side further away from the motor 858.

The clutch assembly 800 includes a compliant member 812. The compliant member 812 exerts an axial biasing force on one or more other components of the clutch assembly 800 (e.g., the torque transfer plate assembly 820, the first material 822, the second output member 836, and/or the second material 842), so as to apply an axial preload on one or more of these components. The compliant member 812 may include a Belleville spring or another suitable compliant member. The clutch assembly 800 may also include a first rigid member 808 and/or a second rigid member 816 (e.g., one or more bushings or shims) on either side of the compliant member 812. The first rigid member 808, may be mechanically coupled to (e.g., in direct and/or rigid contact with) a surface including an inner diameter of the compliant member 812. The second rigid member 816 may be mechanically coupled to a surface including an outer diameter of the compliant member 812. The first rigid member 808 and/or the second rigid member 816 may be configured to aid compression of the compliant member 812, e.g., by maximizing a desired area to contact and/or distribute forces applied to and/or from the compliant member 812. The first rigid member 808 and/or the second rigid member 816 may be formed of a hard material, such as steel or another hard metal or metal alloy.

The clutch assembly 800 also includes a torque transfer plate assembly 820, which may be mechanically coupled to the second rigid member 816 (and/or in direct contact with the compliant member 812, in configurations not including the second rigid member 816). The torque transfer plate assembly 820 includes a first material 822 (e.g., a pad such as a brake pad and/or another suitable material), which may be connected to the torque transfer plate assembly 820 via any suitable means (e.g., glued and/or bonded using an adhesive). The torque transfer plate assembly 820 may be configured to torsionally connect the first output member 804 to the first material 822. The torque transfer plate assembly 820 may be torsionally stiff but axially flexible, e.g., made of a flexible, stamped metal such as Titanium and/or a softer material than the compliant member 812. The torque transfer plate assembly 820 may have a spring rate that is substantially less than (e.g., less than 10% of) the spring rate of the compliant member 812, such that the compliant member 812 provides the dominant axial preload force as compared to the force provided by the torque transfer plate assembly 820. The clutch assembly 800 also includes a set of fasteners 824 (e.g., bolts, screws or other suitable members) that fasten the torque transfer plate assembly 820 to the first output member 804.

The clutch assembly 800 also includes a radial spring 828, e.g., a tolerance ring or other suitable member. The radial spring 828 includes an open annular space in which at least a portion of a first member 832 (e.g., a circular spline) and/or at least a portion of the materials 822, 842 can be disposed and/or constrained. The radial spring 828 can be made of any suitable material, e.g., steel or another metal or metal alloy. The radial spring 828 can include a bushing lining made of any suitable material, e.g., PTFE or another bushing material. The radial spring 828 can include one or more features 830 (e.g., features 830A, 830B as shown in FIG. 8A), which can supply a defined torque for rotational movements and/or zero clearance with mated components. One exemplary arrangement of such features in a "wave" configuration is shown and described below in FIGS. 9A-9B. The radial spring 828 can be tuned so that it only contributes a small amount of torque (e.g., less than 10%) to the entire clutch set-point, while also applying sufficient radial force to enforce concentricity, e.g., to allow self-centering. In some embodiments, a wear characteristic between the radial spring 828 and the mated component can be highly durable due, for example, to reduced contact friction between the radial spring 828 and the mated component. In some embodiments, use of a radial spring 828 allows the tolerance of mating components to be loosened, thereby accommodating for variations caused, for example, by manufacturing processes.

The clutch assembly 800 also includes a first member 832, e.g., a circular spline or another suitable member. The first member 832 can be held between the torque transfer plate assembly 820 and the second output member 836. During operation, the axial preload described above can keep the materials 822, 842 frictionally coupled to the first member 832 until a predetermined torque limit is exceeded. As the first member 832 rotates, the materials 822, 842 frictionally coupled thereto also rotate, and torque is transferred from the first member 832 to the materials 822, 842. As long as the materials 822, 842 are sufficiently pre-loaded against (and/or biased toward) the first member 832, the materials 822, 842 rotate with the first member 832. If a torque limit is exceeded, a static friction limit of the materials 822, 842 may be exceeded, and the first member may slip relative to the materials 822, 842. The torque limit may be based, at least in part (e.g., primarily), on a spring force of the compliant member 812. The torque limit may be also based, at least in part (e.g., less than 10% of a total magnitude), on a spring force of the torque transfer plate assembly 820. In some embodiments, other members (e.g., the members 808, 816) may also contribute to the torque limit (e.g., if they have a non-negligible spring force of their own).

The clutch assembly 800 also includes the second output member 836, which is coupled to the material 842 (e.g., in a similar fashion that the materials 822 is coupled to the torque transfer plate assembly 820). The second output member 836 may be made of a rigid and/or inflexible material, such as Aluminum or another suitable metal or metal alloy. The second output member 836 maintains a compressive force on the stack of parts comprising the clutch assembly 800 and may rotate with the first member 832 and/or the radial spring 828 during operation. Fasteners 840 (e.g., a set of bolts or screws, as shown) can hold the assembly including the second output member 836, the torque transfer plate assembly 820, and the radial spring 828 together.

FIG. 8E is a cross-sectional view of an exemplary drive system 850 including the clutch assembly 800 of FIGS. 8A-8D, according to an illustrative embodiment of the invention. The exemplary drive system 850 shows additional details of one configuration including the clutch assembly 800 that uses a harmonic drive. In this configuration, a wave generator 866 and a flex spline 870 are shown and, together with the first member 832 (here a circular spline), form the harmonic drive. However, one skilled in the art will readily appreciate that other components may also be used, e.g., a cycloidal drive or a plenary drive in place of a harmonic drive. Also visible in this figure is a load cell or torque sensor 874, which is fixed to the housing 854.

When the clutch assembly 800 is integrated with the system described above, it can facilitate overload protection of the motor 858 and/or the harmonic drive while allowing for a speed reduction ratio of the harmonic drive, thus reducing the rotational inertia thereof. As an example, the motor 858 could be rotating rapidly to try to move a connected robot member to a particular location. As the robot member moves, it might hit or bump into an unexpected or undetected object. As a result, without an overload protection system, the motor 858 may be forced to stop in a small period of time (e.g., 1 millisecond). A torque that exceeds (e.g., by many times) the torque capacity of the harmonic drive may be applied thereto to stop it. Designing the harmonic drive to be able to withstand or apply such a high torque may require the harmonic drive to be larger and exhibit a larger inertia (e.g., rotational and/or linear inertia).

As another example, the robot may impact an object, e.g., the robot may fall on a ground surface from a particular height, and the impact may cause a high torque to be applied to the harmonic drive that could cause damage. In another example, the robot may be in an inactive state (e.g., power to the robot via a battery for example is shut down, a cable is broken, or a controller malfunction occurred). If an object impacts the robot in such a state, the controller of the robot might not have power and might thus not send signals to electrically operated safety components designed to protect the robot. In all these examples, the harmonic drive and the motor 858 may be subjected to a high torque that could cause damage to their components.

With the overload protection systems described above, the first member 832 would slip relative to the materials 822, 842 if a load torque on the robot member exceeds a predefined torque limit (e.g., specified at least in part by the axial preload of the compliant member 812). In this manner, the harmonic drive is decoupled for a period of time from the robot member and is thus protected from the high load torque. Further, as the first member 832 slips relative to the materials 822, 842, kinetic energy of the robot member is dissipated due to friction between the first member 832 and the materials 822, 842. Once the load torque falls back below the torque limit, the clutch reengages the harmonic drive with the robot member.

An advantage of an overload protection system designed in accordance with the techniques described herein is that the materials 822, 842 may be integrated within the harmonic drive and interface with the components thereof (e.g., the first member 832). This integration allows for a more compact design compared with and overload protection system having a clutch system arranged inline with the harmonic drive, which would require more axial space. Another advantage is that the torque transfer plate assembly 820 may be configured to allow the robot member to reverse its direction of motion with zero backlash. Many types of robot members operate in two opposing directions. For instance, if the robot member a leg of the robot, the motor 858 may spin in one direction to swing the leg in a corresponding direction, then stop the leg and spin in a reverse direction to swing the leg in an opposite direction. In such circumstances, accurate control of position, speed, and/or acceleration of the leg, in addition to control of the force applied by the leg, may depend on several factors, including zero backlash when reversing the direction of motion.

Backlash may cause one material of the two materials 822, 842 to become engaged with the first member 832 upon reversing direction while the other material might not be engaged. Accordingly, the engaged material may start to slip relative to the first member 832, and then, after a period of time, the other material may start to be loaded; then both materials 822, 842 would slip together relative to the first member 832.

Because of the flexibility of the torque transfer plate assembly 820 and/or compliant member 812, these components can accommodate axial movement of components of the drive system relative to each other. For example, they can accommodate wear in the materials 822, 842 and/or axial movement of the robot member relative to the harmonic drive without overstressing the components. Thus, the torque transfer plate assembly 820 and/or the compliant member 812 can compensate for manufacturing tolerance of the various components. At the same time, the torque transfer plate assembly 820 pushes against the material 822 and causes the materials 822, 842 to remain in contact with the first member 832, thus reducing or eliminating backlash. Therefore, even if the motor 858 and the first member 832 stop, and then their direction of rotation is reversed, the torque transfer plate assembly 820 may ensure smooth movement of the robot member.

Further, the torque transfer plate assembly 820 may cause the torque load to be equally shared between the two materials 822, 842. A force applied by the torque transfer plate assembly 820 maintains contact between the material 822 against the first member 832. The same force applied by the torque transfer plate assembly 820 further squeezes the material 842 against the first member 832 along with the material 822 against the second output member 836. In this way, the materials 822, 842 may be equally loaded as the first member 832 rotates.

The components and configurations described above are example components and configurations and are not meant to be limiting. Other components and configurations could be used. For example, instead of using two materials 822, 842, one material may be used. As another example, instead of the overload protective clutching operation taking place on the interface between the materials 822, 842 and the first member 832, as described above, in another example implementation, the proximal and distal faces of the first member 832 could have friction material disposed thereon. In some embodiments, other components may be added between the first member 832 and the materials 822, 842. In another example variation, the torque transfer plate assembly 820 and the compliant member 812 (and/or at least one of the components 808 and 816) may be integrated into one flexible component.

Figure 9A:
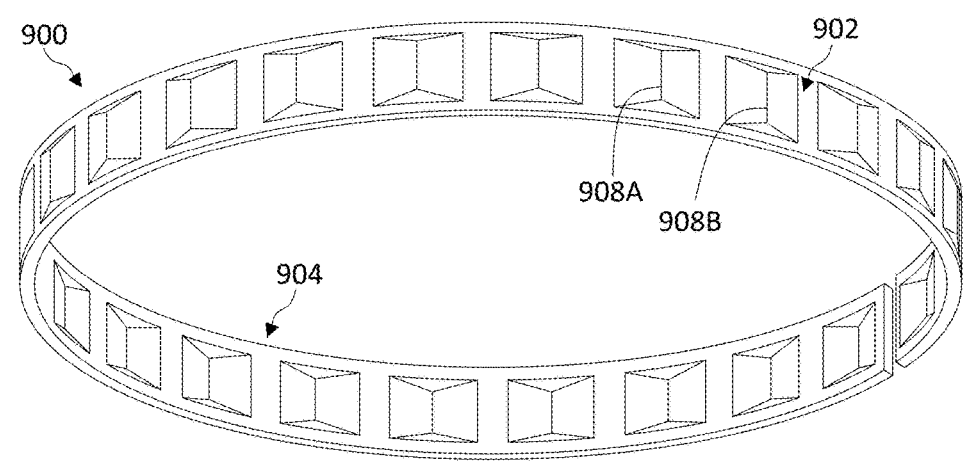
FIG. 9A is a perspective view of an exemplary radial spring, according to an illustrative embodiment of the invention.
Figure 9B:
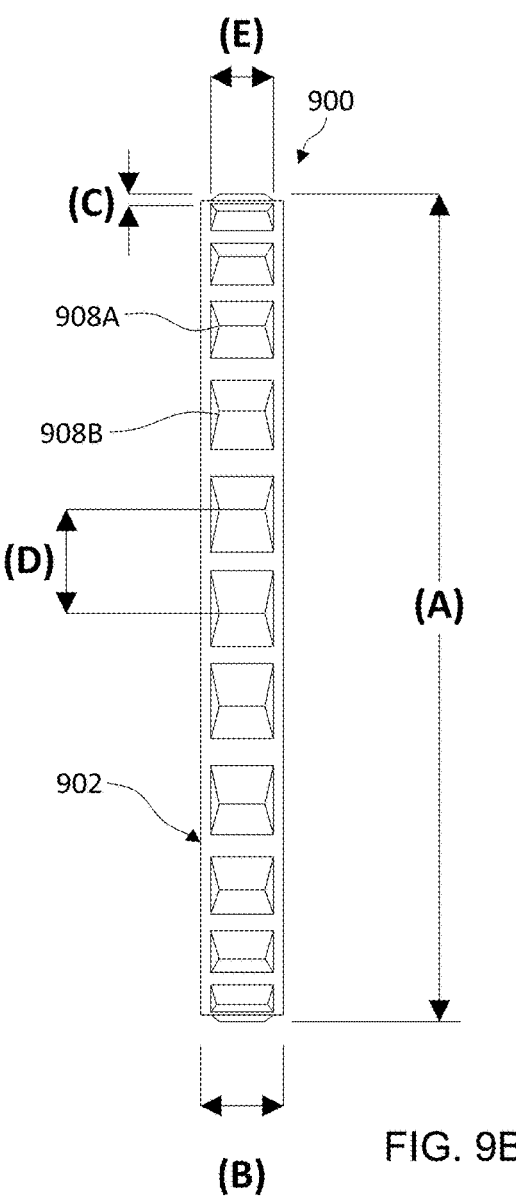
FIG. 9B is a side view of an exemplary radial spring, according to an illustrative embodiment of the invention.

FIG. 9A is a perspective view of an exemplary radial spring 900, according to an illustrative embodiment of the invention, and FIG. 9B is a side view of the radial spring 900. The radial spring 900 may be a tolerance ring and/or may include a bushing lining 904. The radial spring 900 may include a set of features 908 (shown as features 908A, 908B, etc., with not all similar features separately enumerated). The features 908 may include, but are not limited to, protrusions, distensions, extensions, bulges, ridges, protrusions, and castellations. In some embodiments, wave-like crests ("waves") are formed into the radial spring 900 and/or extend outward (e.g., "peak") in a radial direction of the radial spring 900. The features 908 may not be present at the sides of the radial spring 900 (e.g., as measured along a thickness dimension such as designated by arrows B or E in connection with FIG. 9B), but may only begin to appear or form more toward the center. The features 908 may be deformable and/or depressable relative to a center of the radial spring 900, and can (one or more individually and/or collectively) provide a spring-like force in the radial direction. Accordingly, the features 908 can permit the radial spring 900 to be easily mated with a mating component and ultimately press-fit into a mating component, which may, for example, allow replacement of a prior tight-tolerance machining step during manufacturing, reducing complexity and cost.

The radial spring 900 may include an outer layer 902 and an inner layer 904. The outer layer 902 may be made of a hard material, such as steel (e.g., stainless steel), iron or another abrasion-resistant metal or metal alloy. The inner layer 904 may include a laminated layer and/or bushing comprising, e.g., PTFE or another bushing material. In some embodiments, during operation, the bushing can apply a low rotational drag on the first member (e.g., the circular spline shown and described above) that remains constant or substantially constant over a lifetime of the clutch. In this way, a clutch with a consistent or substantially consistent slip torque can be provided. In some embodiments, the bushing can apply a constant or substantially constant radial force to the first member (e.g., for a circular spline, holding it in its cylindrical shape and/or preventing it from deforming under high loads). Such a configuration may maintain a high efficiency of the drive unit after clutch slip events.

In some embodiments, a thickness of the material comprising the outer layer and/or the inner layer may be on the order of tenths of millimeters. In some embodiments, further dimensions specifying the radial spring 900 and/or the features 908 may be denoted by some or all of those shown in FIG. 9B. In FIG. 9B, the distance A may refer to a diameter of the tolerance ring, e.g., an exterior diameter as measured to the edge of the outermost feature 908. The distance B may refer to a width or thickness. The distance C may refer to the feature height (e.g., wave height). The distance D may refer to the feature pitch (e.g., wave pitch). The distance E may refer to the feature width or thickness (e.g., wave width or thickness). In some embodiments, effects of thermal expansion during operation can be minor in comparison to the force that the features 908 exert on the mated component.

FIG. 10 is a flowchart showing an exemplary method of operating a clutch, according to an illustrative embodiment of the invention. In step 1002, rotational energy is supplied to a first member (e.g., the first member and/or circular spline shown and described above) of a clutch assembly (e.g., the clutch assembly 800 shown and described above). In step 1004, a torque load is transferred from the first member of the clutch assembly to a torque transfer plate by means of at least one material (e.g., a brake pad or another suitable material) frictionally coupled to the first member and/or adhered to the torque transfer plate (e.g., the torque transfer plate 820 shown and described above), wherein a radial spring (e.g., the radial spring 832 shown and described above) surrounds the first member of the clutch assembly. In step 1006, when the torque load satisfies a torque limit defined at least in part by a compliant member (e.g., the compliant member 812 shown and described above in FIGS. 8A-8D) of the clutch assembly, the first member slips relative to at least one material frictionally coupled to the first member (e.g., the first material 822 and/or the second material 842 shown and described above in FIGS. 8A-8D).

FIG. 11 is a flowchart showing an exemplary method 1110 of manufacturing a clutch assembly, according to an illustrative embodiment of the invention. In some embodiments, some or all of the components shown above (e.g., in FIGS. 8A-8B) can be stacked and/or assembled as shown above (e.g., in FIGS. 8C-8D). Method 1110 illustrates one possible manufacturing method, although those skilled in the art will appreciate that other methods (e.g., those including some of the same or similar steps) are possible. In act 1112, a first output member (e.g., element 804 shown above) is provided, starting a component stack. In act 1114, a compliant member (e.g., element 812 shown above) is inserted into the component stack. In act 1116, a torque transfer plate assembly (e.g., element 820 shown above, having first pad 822) is inserted into the component stack. In act 1118, the component stack is fastened together (e.g., using fasteners 824 shown above). In act 1120, a radial spring (e.g., element 828 shown above) is positioned relative to a first member (e.g., element 832 shown above). In act 1122, the radial spring and the first member are inserted into the component stack. In act 1124, a second output member (e.g., element 836 shown above) is fastened to the first member.

A number of implementations have been described. Nevertheless, it will be understood that various modifications may be made without departing from the spirit and scope of the disclosure.

The invention claimed is:

1. A clutch assembly comprising:
   a housing;
   a harmonic drive at least partially positioned within the housing, the harmonic drive including:
      a wave generator configured to mechanically couple to an input shaft,
      a flex spline fixed with respect to the housing, and
      a circular spline arranged to rotate at a different speed than the wave generator when the wave generator rotates;
   a first pad frictionally coupled to a distal side surface of the circular spline;
   a second pad frictionally coupled to a proximal side surface of the circular spline;
   a compliant member configured to apply an axial force on the first pad and the second pad; and a radial spring surrounding an exterior surface of the circular spline, the radial spring comprising a bushing lining.

2. The assembly of claim 1, wherein the axial force defines, at least in part, a torque limit, and wherein when the torque limit is exceeded, the circular spline slips relative to at least one of the first pad or the second pad.

3. The assembly of claim 2, wherein the radial spring defines, at least in part, the torque limit.

4. The assembly of claim 1, wherein the compliant member comprises a Belleville spring.

5. The assembly of claim 1, wherein the radial spring comprises a tolerance ring.

6. The assembly of claim 1, wherein the radial spring includes a set of features extending radially outward from an exterior surface of the radial spring.

7. The assembly of claim 6, wherein the set of features includes at least one of protrusions, distensions, extensions, ridges, bulges, extrusions, or castellations.

8. The assembly of claim 1, wherein during operation, the bushing lining is configured to apply a substantially constant radial force to the circular spline.

9. The assembly of claim 1, further comprising a first output member surrounding the compliant member.

10. The assembly of claim 9, further comprising a second output member coupled to at least one of the first pad or the second pad.

11. A robot comprising the assembly of claim 1, and further comprising a motor configured to drive movement of a member of the robot.

12. The robot of claim 11, wherein the robot comprises a quadruped.

13. The robot of claim 11, wherein the robot comprises a biped.

14. The robot of claim 11, wherein the second pad is coupled to a second output member, the second output member being coupled to the member of the robot.

15. A robot comprising:

a member configured to interact with an environment of the robot; and the assembly of claim 1, wherein the assembly is configured to drive movement of the member.

* * * * *